United States Patent [19]
Ross et al.

[11] 3,789,413
[45] Jan. 29, 1974

[54] RADIO NAVIGATION SYSTEM
[75] Inventors: Gerald F. Ross, Lexington, Mass.;
Robert S. Jacobson, Phoenix, Ariz.
[73] Assignee: Sperry Rand Corporation, New York, N.Y.
[22] Filed: June 12, 1972
[21] Appl. No.: 261,834

[52] U.S. Cl............... 343/113 R, 328/133, 235/186
[51] Int. Cl........................... G01s 5/02, H03b 3/04
[58] Field of Search.. 343/113 R, 112 CA; 328/129, 328/133

[56] References Cited
UNITED STATES PATENTS
| | | | |
|---|---|---|---|
| 3,555,185 | 1/1971 | Skrydstrup et al.................. | 328/133 |
| 3,383,690 | 5/1968 | Keller.............................. | 343/113 R |
| 3,680,124 | 7/1972 | Stone et al...................... | 343/113 R |

Primary Examiner—Maynard R. Wilbur
Assistant Examiner—S. C. Buczinski
Attorney, Agent, or Firm—Howard P. Terry

[57] ABSTRACT

The radio navigation system provides simple instrumentation for transmitting omnidirectional radio waves from a reference location and for determining the azimuth and elevation angles of arrival of the transmitted waves at a remote receiver. An array of paired receiver antennas is employed for the measurement of differences in time of arrival of the transmitted waves at the paired antennas and these values are manipulated by a simple analog computer to yield the desired azimuth and elevation data.

9 Claims, 6 Drawing Figures

RADIO NAVIGATION SYSTEM

BACKGROUND OF THE INVENTION

1. Field of the Invention

The invention pertains to cooperative radio navigation equipment of the direction finding type and more particularly relates to a navigation receiver-computer system for deriving the time of arrival of signals at an array of relatively fixed antenna elements and for computing the angle of arrival of the received radio waves.

2. Description of the Prior Art

Prior art radio systems include various high frequency radio direction finding and other transmitter and receiver systems for use with mobile vehicles as aids to navigation and for collision avoidance purposes. Systems suitable for radio navigation available in the prior art are generally complex devices with fixed transmitters and depend upon governemnt maintenance of the transmitters. Such expensive systems generally do not play a direct role in assuring collision avoidance between moving vehicles.

It has been desired, for example, to provide azimuth information in a cooperating aircraft with simple airborne direction finder apparatus and a simple portable omnidirectional transmitter which may be located in a second cooperating aircraft or, for example, at a fixed point generally at ground level.

Prior art radio direction finder systems have generally required use of null seeking loops as direction finding antennas, of interferometric methods, or of lobed cardiod receptivity patterns generated by mechanical switching of multiple active receiver antenna elements with respect to the direction finder input circuit.

The commutation or switching of multiple antenna elements of prior art lobed systems present a serious service source of defective operation. Subject to wear and consequently to gradual deterioration, such prior art switching systems tend to be lossy and often require complex impedance matching as well as multiple and sensitive tuning means. Narrow band operation and unreliability are often a consequence of such requirements.

SUMMARY OF THE INVENTION

The present invention relates to simple cooperative radio navigation equipment of the direction finding kind providing capabilities also for collision avoidance and for control of aircraft landing and take off. The invention utilizes pairs of receiver antennas fixed in an array for illumination by a wave front broadcast from a cooperating aircraft or from a ground station. The navigational receiver-computer apparatus aboard the aircraft derives time differences between the times of arrival of the wave at paired antenna elements and computes the azimuth and elevation angles of arrival of the illuminating wave front.

The invention utilizes inexpensive and simple broad band transmitter and receiver elements and simple analog computer apparatus to provide the desired measures. Cross country navigation and landing and take off guidance are provided, the same installation providing the collision warning function.

DESCRIPTION OF THE PREFERRED EMBODIMENTS

Figure 1:
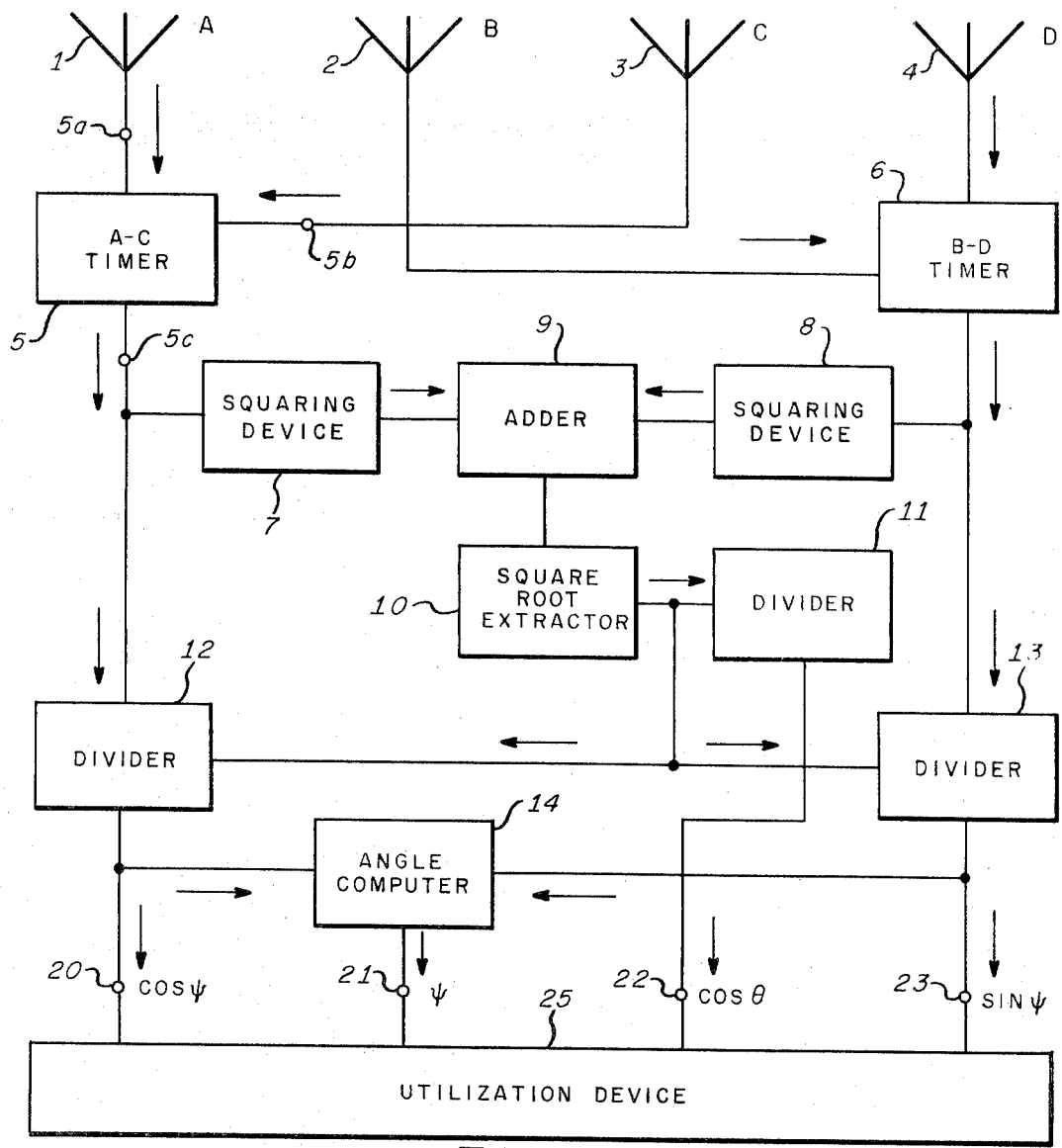
FIG. 1 is a block diagram showing electrical connections between various components of the invention.
Figure 3:
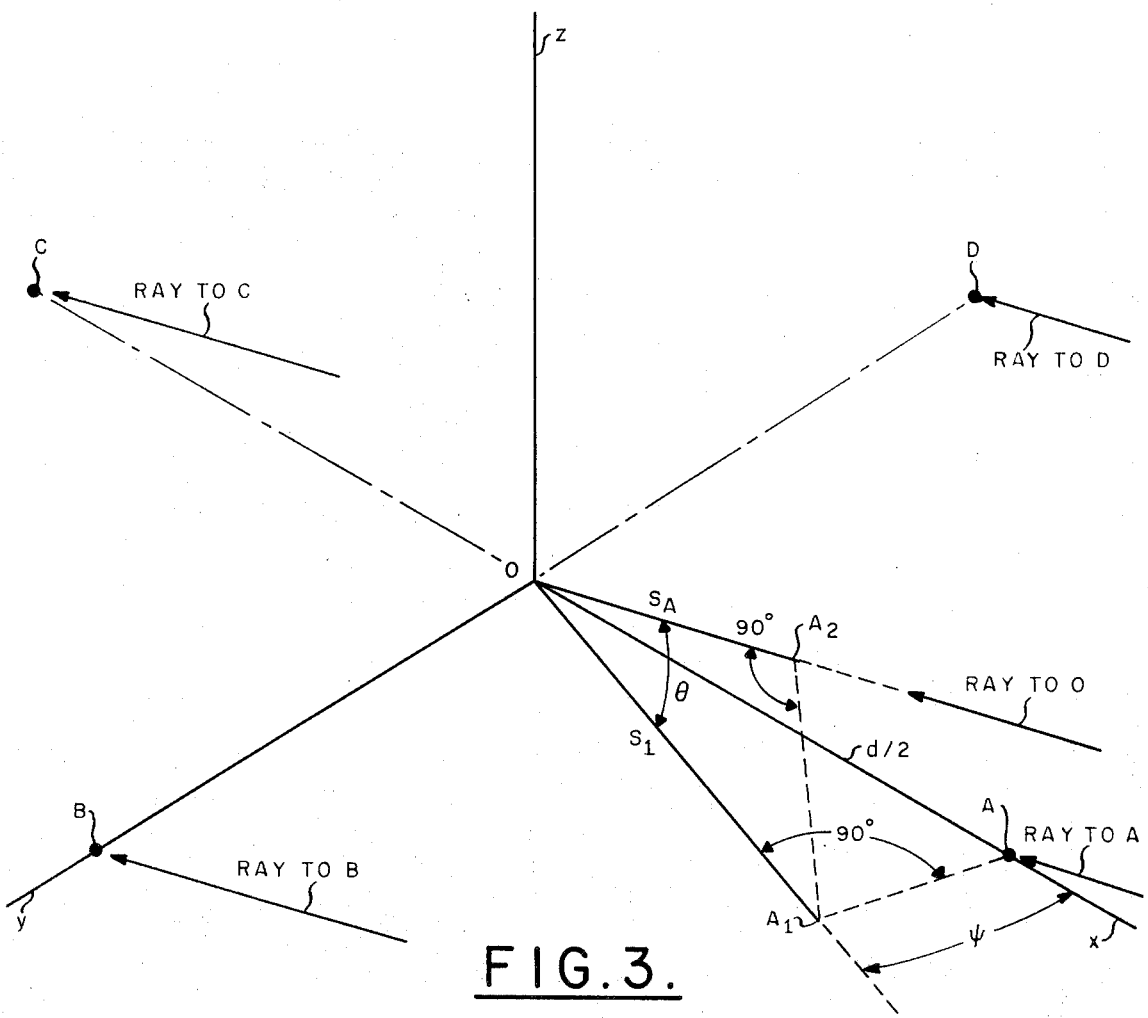
FIG. 3 is an isometric projection useful in explaining the theory of the invention.

Referring to FIGS. 1 and 3, the direction finder and collision avoidance receiver system of the present invention utilizes two pairs of antennas 1, 3, and 2, 4 mounted in fixed relation, for example, on a vehicle exterior surface such as that of an aircraft. Antennas 1 and 3 are located at opposite positions A and C on an axis AOC which may be parallel to the fore and aft axis of the craft, and are spaced by equal distances $d/2$ from the origin O. Similarly, antennas 2 and 4 are located at opposite positions C and D on an axis COD at right angles to axis AOB, and are also spaced by equal distances $d/2$ from the origin O. Thus, antennas 1 through 4 may be located at respective equally spaced positions A, B, C, D on a circular locus whose center is the origin O.

In this cooperative system, each aircraft may be supplied with a receiver system such as that of FIG. 1 and each with a transmitter of suitable type. Operation of such systems may be fully explained in terms of the cooperation between one aircraft having such a transmitter (Station T) and another containing the receiver of FIG. 1 (Station R), though it will be understood that each aircraft may be fully equipped to participate cooperatively in transmission and reception.

The transmitter at Station T may be a simple device of conventional nature for producing omnidirectional broadcasts of signals from a conventional non-directional antenna. To avoid shadowing effects inherent in the presence of the craft fuselage, sets of omnidirectional antennas may be used to produce simultaneous emissions above and below the craft. A transmitter convenient for use in the system is one for producing a train of regularly spaced high frequency pulses each containing, for example, 10 or more cycles at the radio frequency; X-band microwave radiation may be employed.

Each such pulse or high frequency burst is received at Station R by each of antennas 1, 2, 3, 4, but evidently at slightly different times. The time of arrival is clearly related to the azimuth angle $\psi$ (FIG. 3) between the fore-aft axis of the Station R craft and the direction of Station T, as will be shown.

As seen in FIG. 3, the receiving antennas 1, 2, 3, 4 are respectively set up at locations A, B, C, D on the $x$–$y$ plane of an x, y, z coordinate system. Thus, the distance between antennas 1 and 3 or between antennas 2 and 4 is d. Now, assume that the radiation source of Station T is located a large distance away so that the rays arriving in the region of antennas 1, 2, 3, 4 are parallel. These parallel rays arrive at the aforementioned azimuth angle $\psi$ and at an elevation angle $\theta$ with respect to the $x$–$y$ plane.

Let $S_1$ be the actual distance in the $x$–$y$ plane between the origin O and the point $A_1$ indicated in FIG. 3; also let $S_4$ be the actual distance along the ray directed at the origin O from the origin O to the point $A_2$. Evidently:

$$S_1 = d/2 \cos \psi \quad (1)$$

and $$S_A = S_1 \cos \theta \quad (2)$$

It will be seen that the difference $S_A$ in distance travelled by a ray arriving at antenna 1 at location A from Station T and a ray arriving at the origin O is:

$$S_A = d/2 \cos \psi \cos \theta \quad (3)$$

Similar distance difference values may be similarly derived with respect to the antennas found at locations B, C, and D:

$$S_B = d/2 \cos (90° - \psi) \cos \theta \quad (4)$$

$$S_C = d/2 \cos (180° - \psi) \cos \theta \quad (5)$$

$$S_D = d/2 \cos (270° - \psi) \cos \theta \quad (6)$$

Using well known trigonometric identities, equations 3 through 6 may be converted to read as follows:

$$S_A = d/2 \cos \psi \cos \theta \quad (3)$$

$$S_B = d/2 \sin \psi \cos \theta \quad (7)$$

$$S_C = d/2 \cos \psi \cos \theta \quad (8)$$

$$S_D = d/2 \sin \psi \cos \theta \quad (9)$$

The values indicated in equations 3, 7, 8, and 9 are the primary values measured according to the present invention and, as will be seen, they will be manipulated to yield information on the angle of arrival of the parallel ray system.

To achieve the desired result, the values $(S_A - S_C)$ and $(S_B - S_D)$ are formed. The first quantity is the difference in time of arrival of the rays at antennas 1 and 3, while the second is the difference in time of arrival of the rays at antennas 2 and 4:

$$(S_A - S_C) = d \cos \psi \cos \theta \quad (10)$$

and:

$$(S_B - S_D) = d \sin \psi \cos \theta \quad (11)$$

As will be seen, the quantities expressed by equations 10 and 11 are added according to the invention after each is squared:

$$(S_A - S_C)^2 + (S_B - S_D)^2 = d^2 \cos^2 \theta (\cos^2 \psi + \sin^2 \psi) \quad (12)$$

But no matter what the angle value, the quantity $(\cos^2\psi + \sin^2\psi)$ is identically unity, and therefore equation 12 simplifies to:

$$(S_A - S_C)^2 + (S_B - S_D)^2 = d^2 \cos^2 \theta \quad (13)$$

so that:

$$\cos \theta = 1/d \sqrt{(S_A - S_C)^2 + (S_B - S_D)^2} \quad (14)$$

Equation 14 provides $\theta$, the elevation angle of arrival of the rays. The determination of $\psi$, the azimuth angle of arrival, is made from this value of $\theta$:

$$\cos \psi = S_A - S_C/d \cos \theta \quad (15)$$

and $$\sin \psi = S_B - S_D/d \cos \theta \quad (16)$$

Antennas 1, 2, 3, 4 may be relatively simple nondirective antennas such as conventional dipole or monopole devices and may be mounted with respect to the craft exterior surface in a manner well known in the art so that their operation is relatively undisturbed by adjacent surfaces of the craft. A signal received by each of the paired antennas 1 and 3 is supplied to respective input terminals 5a, 5b of timer 5 and a unidirectional signal representing the time difference between the leading edges of the input signals appears at output terminal 5c. This signal is, in fact, proportional in amplitude to the time difference:

$$S_A - S_C = Kd \cos \psi \cos \theta \quad (17)$$

the factor $K$ accounting for circuit constants inherently present in timer 5.

In a similar manner, a signal received by each of the paired antennas 2 and 4 is supplied to the respective input terminals of timer 6 and a unidirectional signal representing the time difference between the leading edges of the input signals appears at the output of timer 6. This signal is proportional in amplitude to the time difference:

$$(S_B - S_D) = Kd \sin \psi \cos \theta \quad (18)$$

where the same $K$ factor is readily used, since the circuits of timers 5 and 6 are duplicates one of the other.

The respective unidirectional signals representing the outputs of timers 5 and 6 are coupled one each as inputs to respective squaring circuits 7 and 8. The squaring circuits 7 and 8 may be any one of several conventional squaring, or basically, multiplier circuits. For example, quarter squares multipliers, biased diode squaring circuits, or triode squaring circuits as well as other arrangements are available in the prior art. The operation implied in equation 13 is next performed by a conventional adder circuit 9 so that the adder output produced is $K^2d^2\cos^2\theta$.

The quantity $K^2d^2\cos^2\theta$ in the form of a unidirectional voltage is applied to conventional square root circuit 10 to produce the value $Kd \cos \theta$ for supply to divider 11. A simple resistor network known in the prior art for approximating square roots may be employed, for example.

As noted previously, the value $K$ is a fixed or known quantity characteristic of timers 5 and 6. Also, the value of $d$ is predetermined by the fixed spacing of the antenna pairs 1, 3 and 2, 4. Accordingly, divider 11 is arbitrarily adjusted to divide the value $Kd \cos \theta$ by $Kd$, yielding simply the desired value $\cos \theta$ as a useful output at terminal 22.

The value $Kd \cos \theta$ supplied by square root circuit 10 is used also to derive measures of $\psi$, as will now be explained in connection with the conventional analog divider circuits 12 and 13. For example, the values $Kd \cos \psi \cos \theta$ and $Kd \cos \theta$ are supplied to divider 12. As a consequence, the desired value $\cos \psi$ is found on terminal 20. In a similar way, $Kd \sin \psi \cos \theta$ and $Kd \cos \theta$ are fed to the two inputs of divider 13, the value $\sin \psi$ appearing on the output terminal 23 thereof. The value of $\psi$ may be computed in the well known manner by applying the respective $\cos \psi$ and $\sin \psi$ outputs of dividers 12 and 13 to conventional trigonometric converter 14, yielding a unidirectional signal proportional to $\psi$ on terminal 21.

Utilization device 25 may take on any of several complexions. For example, utilization device 25 may in one form simply include individual display devices for indicating the several amplitudes of $\psi$, $\cos \psi$, and $\sin \psi$. Finite values of either $\cos \psi$ or $\sin \psi$ indicate that signals are being received from Station T. If such finite values are displayed along with a zero value of $\psi$, the craft pilot is warned to turn at once to the right or to the left of present course so that $\psi$ is significantly increased. It will, of course, be seen by those skilled in the art that selectable finite values of $\psi$ can also be arranged to indicate a collision path independent on the relative orientation of axes AOC and BOD with respect to the longitudinal axis of the craft. A value of $\psi$ which remains constant may also indicate collision potential.

Angle computer 14 may take various forms. For example, it may be desirable to use such values of $\sin \psi$ and $\cos \psi$ also for computation purposes in various known radio and other navigation systems aboard the craft. In such applications, manipulation of data by selsyns or other multiple wire data transmission systems is often used. For such uses, the unidirectional analog voltages representing $\sin \psi$ or $\cos \psi$ appearing at the respective output terminals 20 and 22 may be used to modulate a sine wave, such as a 400 Hertz wave, for directly simulating the outputs of a transmitter resolver excited with 400 cycle per second energy with the resolver shaft position set at the angle $\psi$. Such resolver outputs may be used to position the shaft of a receiver resolver at the angle $\psi$ by using a standard servo combination including an error detector, a power amplifier, and a servo monitor. Alternatively, the modulated alternating analog signals may be coupled through a Scott-tee transformer to produce at its output the common three-wire synchro signals for controlling other synchro instrumentation. It will also be apparent to those skilled in the art that the unidirectional signals appearing at terminals 20 through 23 may be converted into digital form for use in a digital navigation computer or elsewhere for automatic control purposes.

Figure 2:
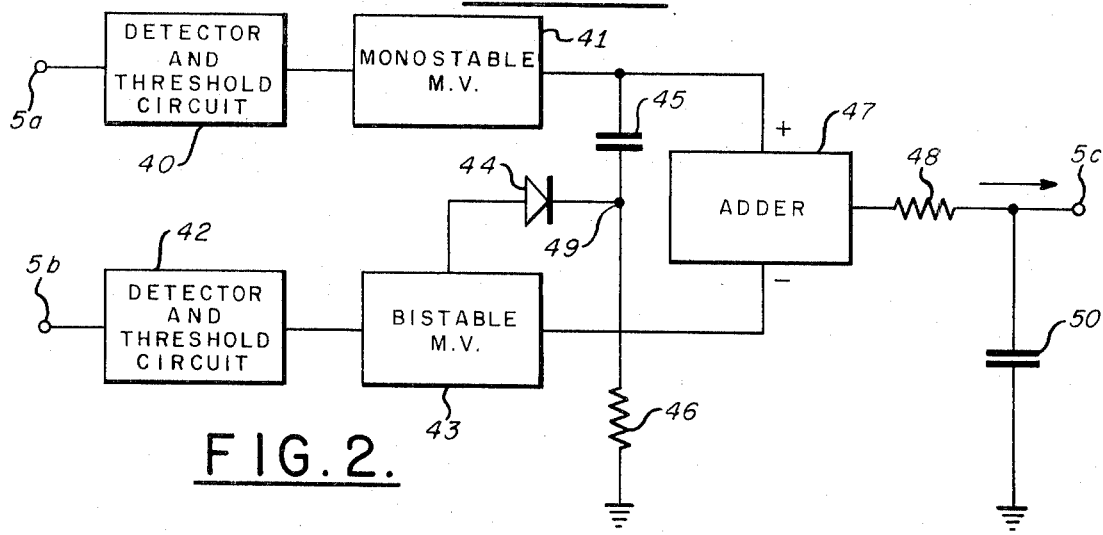
FIG. 2 is a detailed circuit diagram of the timers employed in FIG. 1.

FIG. 2 illustrates details of a circuit useful in FIG. 1 for performing the functions of the timers 5 and 6, though other timers may be used. Specifically with regard to the A-C timer 5 of FIG. 1, the circuit of FIG. 2 shows input terminals 5a and 5b and the output terminal 5c of FIG. 1. In FIG. 2, the signal on input terminal 5a is supplied through a conventional detector and threshold circuit 40 to monostable multivibrator 41. Likewise, the signal on input terminal 5b is connected through a similar conventional detector and threshold circuit 42 to bistable multivibrator 43. Threshold circuits 40 and 42 reject noise signals and other undesired signals which would cause adverse operation of timer 5. Those signal pulses passed by threshold circuits 40 and 42 are taken to represent desired signals for operation of pulse forming circuits 41 and 43. They may be applied through a limiter amplifier (not shown) or other similar agency to circuits 41 and 43.

Monostable or one-shot multivibrator 41 is of the kind in which the leading edge of an incoming pulse will change the state of the circuit, but only temporarily depending upon its selected internal time constant. After that interval, it uniformly reverts to its original state. Bistable multivibrator 43 is triggered to change state by the output of the threshold circuit of circuit 42.

The output of monostable circuit 41 is connected through capacitor 45, junction 49, and resistor 46 to ground. The wave form at junction 49 (wave 63 of FIG. 4) is coupled through diode 44 as a control input (wave 64) to bistable circuit 43. Which bistable multivibrator 43 is triggered to change state by the output of circuit 42, it is returned to its original state at the same time that the monostable circuit 41 automatically reverts to its initial state and thus produces wave 65. This is accomplished by the differentiating effect of the R-C circuit 45 – 46 and by diode 44.

Figure 4:
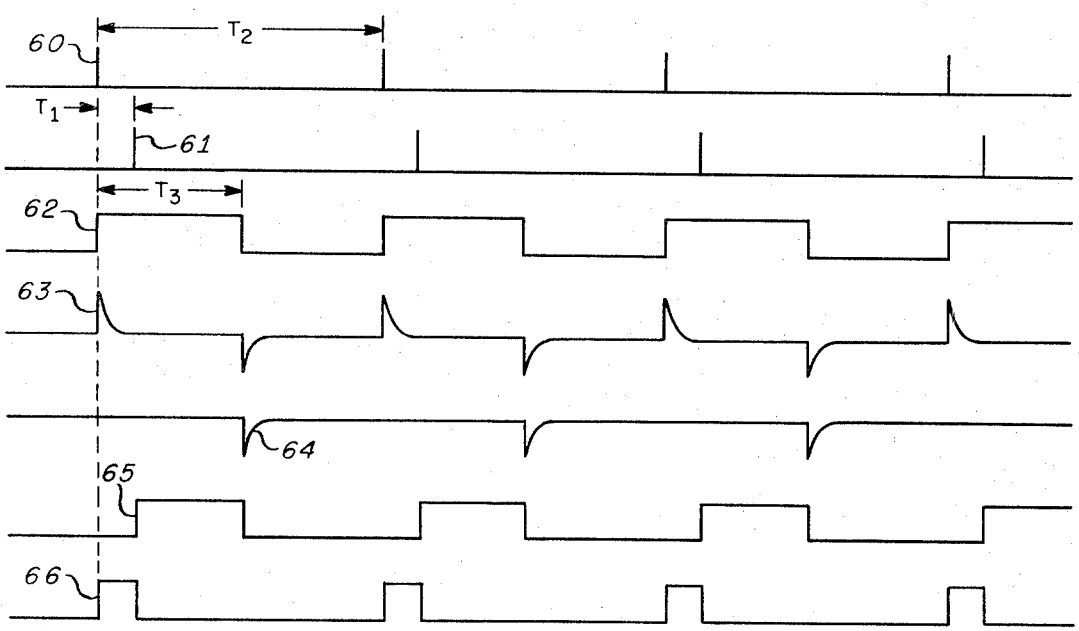
FIGS. 4, 5, and 6 are graphs of wave forms useful in explaining operation of the invention.

Now refer to FIG. 4, which represents the arrival of the transmitted wave at location A prior to its arrival at location C. Let $T_1$ refer to the time between successive pulses at A and C as received by the respective antennas 1 and 3 (see waves 60 and 61). The quantity $T_2$, the time between successively radiated pulses (wave 60) from the transmitter, is very long compared to time $T_1$. The actual value of time $T_2$ is not critical, because it does not enter into the computation of the angle $\psi$ according to the invention.

The pulse received by antenna 1 at location A triggers monostable circuit 41, whose recovery time $T_3$ (wave 62) is long compared to the maximum value of time $T_1$, but is still shorter than time $T_2$. Thus:

$$T_1 < T_3 < T_2 \qquad (19)$$

As long as the inequality 19 holds, the value of time $T_3$ does not require close control, not entering into the computation of $\psi$.

A pulse received at location C by antenna 3 triggers bistable circuit 43 whose return to its original state is arranged, as previously noted, to occur simultaneously with the return of monostable circuit 41 to its original state. Thus, multivibrators 41 and 43 respectively turn on in coincidence with the start of the respective pulses collected at locations A and C, but turn off together at the time of automatic recovery of monostable circuit 41. Accordingly, waves 62 and 65 are used as inputs for the algebraic adder 47.

Adder 47 produces output wave 66 of FIG. 4. Wave 66 is made up of pulses whose length is proportional to time $T_1$, and whose polarity is indicative of the order of arrival of signals from A and C. Wave 66 is subjected to integration or smoothing by R-C circuit 48–50, so that the output at terminal 5c is an averaged value of wave 66; in the case illustrated, the voltage at terminal 5c is positive and proportional to $T_1/T_2$ or to $S_A-S_C$. An analogous explanation applies also to the operation of the B-D timer 6 when the wave from location B arrives before the wave from location D.

Figure 5:
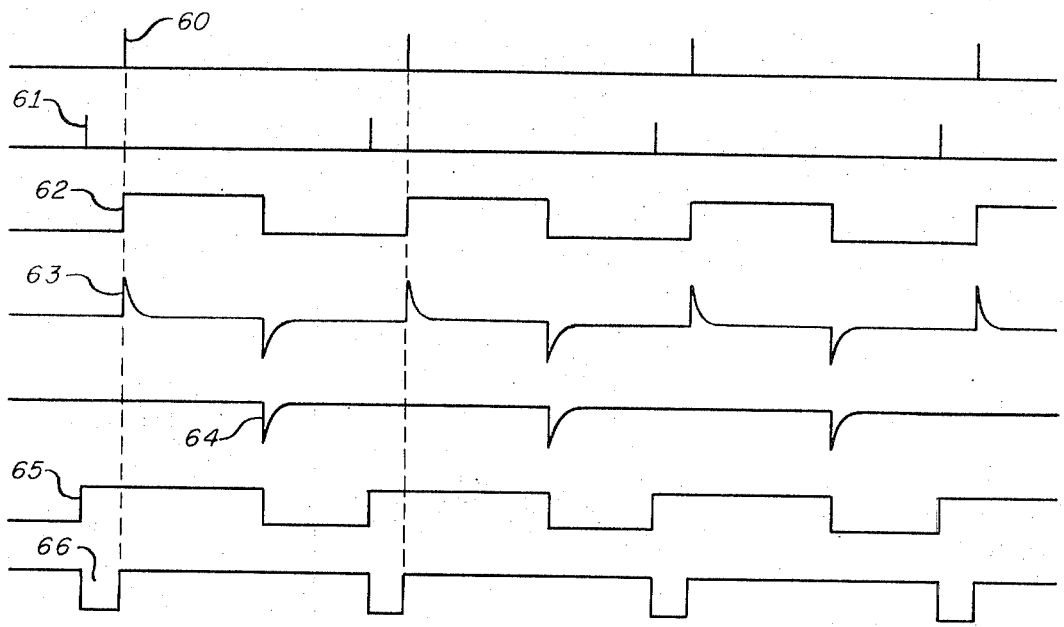
Figure 6:
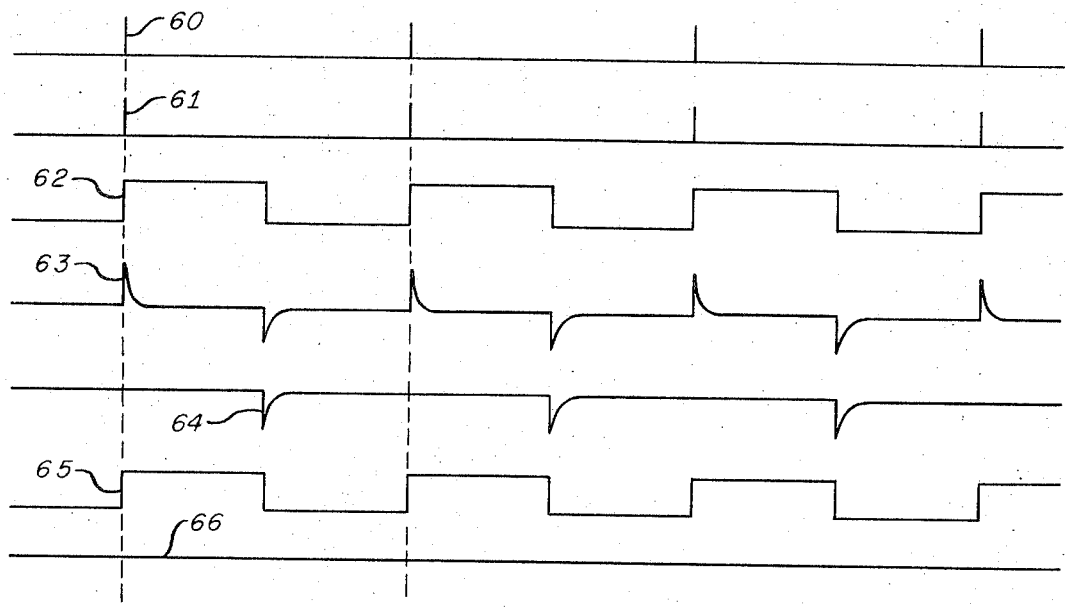

FIG. 5 is illustrative of the operation of A-C timer 5 when the wave 61 from location C arrives before the wave 60 from location A. It is observed that the general operation of the timer is similar to that just described. In this situation, however, the subtraction of wave 65 from wave 62 in circuit 47 produces wave 66 which is composed of negative pulses of duration proportional to $T_1/T_2$. Accordingly, the integrated output at terminal 5c is negative and proportional to $T_1/T_2$. FIG. 5 illustrates the unique situation in which pulses from locations A and C arrive in timer 5 simultaneously. In this situation, the waves 62 and 64 are arranged exactly to cancel, leaving a zero output at terminal 5c. It will again be apparent that the operation of B-D timer 6 is similar under analogous circumstances.

The versatility of the invention is illustrated by the fact that it may be used for purposes other than those just described. For example, the invention may be used to control the take off or landing of aircraft. If the transmitter of Station T is located near ground level at a landing field, the pilot of an aircraft equipped with a receiver station R may adjust its flight path relative to the landing field, for instance, by observing the values of $\theta$ and $\psi$ as above described. Navigation of marine vessels in azimuth relative to a harbor or channel may similarly be established. Other uses of the invention will be apparent to those skilled in the art.

While the invention has been described in its preferred embodiment, it will be understood that the words which have been used are words of description rather than of limitation and that changes within the purview of the appended claims may be made without departure from the true scope and spirit of the invention in its broader aspects.

We claim:

1. Radio navigation apparatus responsive to the azimuth and elevation angles of arrival of a substantially plane radio wave front comprising:
    first, second, third, and fourth sensor means separately responsive to the arrival of said plane radio wave front,
    first time-difference measurement means directly responsive to the difference in time of arrival of said plane radio wave front at said first and third sensor means for producing a first direct current output,
    second time difference measurement means directly responsive to the difference in time of arrival of said plane radio wave front at said second and fourth sensor means for directly producing a second direct current output,
    adder means responsive to said first and second time difference measurement means respective first and second direct current outputs,
    first and second divider means responsive respectively to said first and second time difference measurement means first and second direct current outputs and jointly for respectively producing voltages proportional to cosine and sine functions of said azimuth angle.

2. Apparatus as described in claim 1 wherein said first time difference measurement means comprises:
    first generator means responsive to said first sensor means for producing a first pulse of predetermined duration,
    second generator means responsive to said second sensor means for producing a first pulse of variable duration,
    circuit means for causing said first pulse of variable duration to terminate upon termination of said first pulse of predetermined duration, and
    adder means for adding said first pulse of predetermined duration and said first pulse of variable duration.

3. Apparatus as described in claim 2 wherein said second time difference measurement means comprises:
    third generator means responsive to said third sensor means for producing a second pulse of predetermined duration,
    fourth generator means responsive to said fourth sensor means for producing a second pulse of variable duration,
    circuit means for causing said second pulse of variable duration to terminate upon termination of said second pulse of predetermined duration, and
    adder means for adding said second pulse of predetermined duration and said second pulse of variable duration.

4. Apparatus as described in claim 1 wherein said sensor means are placed at equally spaced points on a circular locus.

5. Apparatus as described in claim 1 additionally including first and second signal squaring means respectively responsive to said first and second time-difference measurement means for providing first and second inputs to said adder means.

6. Apparatus as described in claim 5 additionally including square root extraction means responsive to said adder means for providing inputs to said first and second divider means.

7. Apparatus as described in claim 5 additionally including third divider means responsive to said square root extraction means for producing an output voltage proportional to a cosine function of said elevation angle.

8. Apparatus as described in claim 1 additionally including angle computer means responsive to said first and second divider means for computing said azimuth angle.

9. Means for generating an output signal of amplitude proportional to the difference in time of arrival of the leading fronts of first and second pulses comprising:
    monostable circuit means responsive to the leading edge of said first pulse for generating a third pulse of predetermined duration,
    bistable circuit means responsive to the leading edge of said second pulse for generating a fourth pulse,
    differentiator means responsive to the trailing edge of said third pulse for producing an output pulse coincident with said trailing edge for terminating said fourth pulse, and
    adder means for algebraically adding said third and fourth pulses for generating said output signal.

* * * * *